(12) United States Patent
Candy et al.

(10) Patent No.: US 7,463,690 B2
(45) Date of Patent: Dec. 9, 2008

(54) MULTI-CHANNEL TIME-REVERSAL RECEIVERS FOR MULTI AND 1-BIT IMPLEMENTATIONS

(75) Inventors: James V. Candy, Danville, CA (US); David H. Chambers, Livermore, CA (US); Brian L. Guidry, Tracy, CA (US); Andrew J. Poggio, Livermore, CA (US); Christopher L. Robbins, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/271,334

(22) Filed: Nov. 10, 2005

(65) Prior Publication Data

US 2006/0098746 A1  May 11, 2006

Related U.S. Application Data

(63) Continuation-in-part of application No. 10/289,774, filed on Nov. 6, 2002.

(60) Provisional application No. 60/627,397, filed on Nov. 12, 2004.

(51) Int. Cl.
H04L 27/00 (2006.01)
(52) U.S. Cl. ............................... 375/259; 375/346
(58) Field of Classification Search ............ 375/259; 455/39, 40
See application file for complete search history.

(56) References Cited

U.S. PATENT DOCUMENTS

| | | | | |
|---|---|---|---|---|
| 5,155,742 A | | 10/1992 | Ariyavisitakul et al. | |
| 5,335,250 A | * | 8/1994 | Dent et al. | 375/224 |
| 5,428,999 A | | 7/1995 | Fink | |
| 5,677,934 A | * | 10/1997 | Ostman | 375/349 |
| 6,272,187 B1 | | 8/2001 | Rick | |
| 6,590,512 B2 | * | 7/2003 | Roh et al. | 341/143 |
| 6,834,043 B1 | * | 12/2004 | Vook et al. | 370/310 |
| 6,889,355 B1 | * | 5/2005 | Calderbank et al. | 714/792 |
| 2001/0037075 A1 | | 11/2001 | Candy | |
| 2003/0138053 A1 | | 7/2003 | Candy et al. | |

FOREIGN PATENT DOCUMENTS

EP      0 840 972 B1   12/2003
WO     WO 01/58027 A2   8/2001

OTHER PUBLICATIONS

Candy, J., et al., "Multichannel Time Reversal Comunications in a Highly Reverberative Environment," Journal of the Acoustic Society of America, May 2004, vol. 115, 5, 40 pgs.

* cited by examiner

Primary Examiner—Curtis B Odom
(74) Attorney, Agent, or Firm—Eddie E. Scott; John H. Lee

(57) ABSTRACT

A communication system for transmitting a signal through a channel medium comprising digitizing the signal, time-reversing the digitized signal, and transmitting the signal through the channel medium. In one embodiment a transmitter is adapted to transmit the signal, a multiplicity of receivers are adapted to receive the signal, a digitizer digitizes the signal, and a time-reversal signal processor is adapted to time-reverse the digitized signal. An embodiment of the present invention includes multi bit implementations. Another embodiment of the present invention includes 1-bit implementations. Another embodiment of the present invention includes a multiplicity of receivers used in the step of transmitting the signal through the channel medium.

10 Claims, 9 Drawing Sheets

MULTI-CHANNEL TIME-REVERSAL RECEIVERS FOR MULTI AND 1-BIT IMPLEMENTATIONS

CROSS-REFERENCE TO RELATED APPLICATIONS

This application is a Continuation-in-Part of U.S. patent application Ser. No. 10/289,774 filed Nov. 6, 2002 titled, "Time Reversal Communication System." U.S. patent application Ser. No. 10/289,774 filed Nov. 6, 2002 and titled, "Time Reversal Communication System" is incorporated herein by reference.

This application claims the benefit of U.S. Provisional Patent Application No. 60/627,397 filed Nov. 12, 2004 by James V. Candy et al and titled "Multi-channel Time-Reversal Receivers for Multi and 1-Bit Implementations." U.S. Provisional Patent Application No. 60/627,397 filed Nov. 12, 2004 and titled "Multi-channel Time-Reversal Receivers for Multi and 1-Bit Implementations" is incorporated herein by reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to communications and more particularly to a time reversal communication system.

2. State of Technology

U.S. Pat. No. 5,155,742 for a time dispersion equalizer receiver with a time-reversal structure for TDMA portable radio systems to Sirikiat Ariyavisitakul and Hamilton Arnold provides the following background information, "Although the performance (i.e., low block error rate) of a receiver in a TDM/TDMA portable digital radio communications system using a time reversal phase equalizer structure for very high bit rate data communications will not be as high as a receiver using a time reversal conventional DFE structure, its performance for expanding coverage areas at moderate bit rates expected in voice communications has been experimentally found to be acceptable and is simpler to implement than receivers using conventional equalization techniques without the time reversal structure."

U.S. Patent Application No. 2003/0138053 for a time reversal communication system by James V. Candy and Alan W. Myers published Jul. 24, 2003 provides the following state of technology information, "Communicating critical information over noisy channels in hostile environments whether they be a chaotic battlefield, or in disaster emergencies evolving from natural disasters like earthquakes, tornadoes or floods, or on the floor of a securities exchange, or even in the clandestine operations of national security—the data must be reliably received and extracted. A typical communications channel is subjected to a variety of noise and signal distortions, corrupting the fidelity of the information being transmitted, and reducing the effective capacity of the channel."

SUMMARY

The present invention provides a system that is based on time-reversing the impulse response or Green's function characterizing the uncertain communications channel to mitigate deleterious dispersion and multipath effects. Communicating in a complex environment is a daunting problem. Such an environment can be a hostile urban setting populated with a multitude of buildings and vehicles, the simple complexity of a large number of sound sources that are common in the stock exchange, or military operations in an environment with topographic features of hills, valleys, mountains or even a maze of buried water pipes attempting to transmit information about any chemical anomalies in the water system servicing a city or town. These inherent obstructions cause transmitted signals to reflect, refract and disperse in a multitude of directions distorting both their shape and arrival times at network receiver locations. This is the problem with transmitting information in a complex environment. Waves are susceptible to multiple paths and distortions created by a variety of possible obstructions, which may exist in the particular propagation medium. This communications problem is solved by the present invention using the physics of wave propagation to not only mitigate the noxious effects created by the hostile medium, but also to utilize it in a constructive manner enabling a huge benefit in communications. The present invention employs time-reversal (T/R) communications to accomplish this task.

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system of transmitting a signal through a channel medium. The channel medium may be air, earth, water, tissue, metal, and/or non-metal. The present invention provides a communication system for transmitting a signal through a channel medium. The system comprises digitizing the signal, time-reversing the digitized signal, and transmitting the signal through the channel medium. In one embodiment of the invention a transmitter is adapted to transmit the signal, a multiplicity of receivers are adapted to receive the signal, a digitizer digitizes the signal, and a time-reversal signal processor is adapted to time-reverse the digitized signal. An embodiment of the present invention includes multi bit implementations. Another embodiment of the present invention includes 1-bit implementations. Another embodiment of the present invention includes a multiplicity of transmitters used in the step of transmitting the signal through the channel medium. Another embodiment of the present invention includes a multiplicity of receivers used in the step of transmitting the signal through the channel medium.

In one embodiment time-reversing the digitized signal is performed in connection with a transmitter. In one embodiment time-reversing the digitized signal is performed in connection with a receiver. In one embodiment a multiplicity of transmitters are used in transmitting the signal through the channel medium. In one embodiment a multiplicity of receivers are used in transmitting the signal through the channel medium. One embodiment includes estimating Green's function of the channel medium. One embodiment includes determining the Green's function of the channel medium. One embodiment includes transmitting a pilot signal through the channel medium. One embodiment includes estimating a pilot signal as it would be transmitted through the channel medium. In one embodiment a multiplicity of link stations are used in transmitting the signal through the channel medium. One embodiment provides a secure communication to an individual link station of a multiplicity of link stations by digitizing the signal and time-reversing the digitized signal in connection with transmitting the signal through the channel medium to the individual link station.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
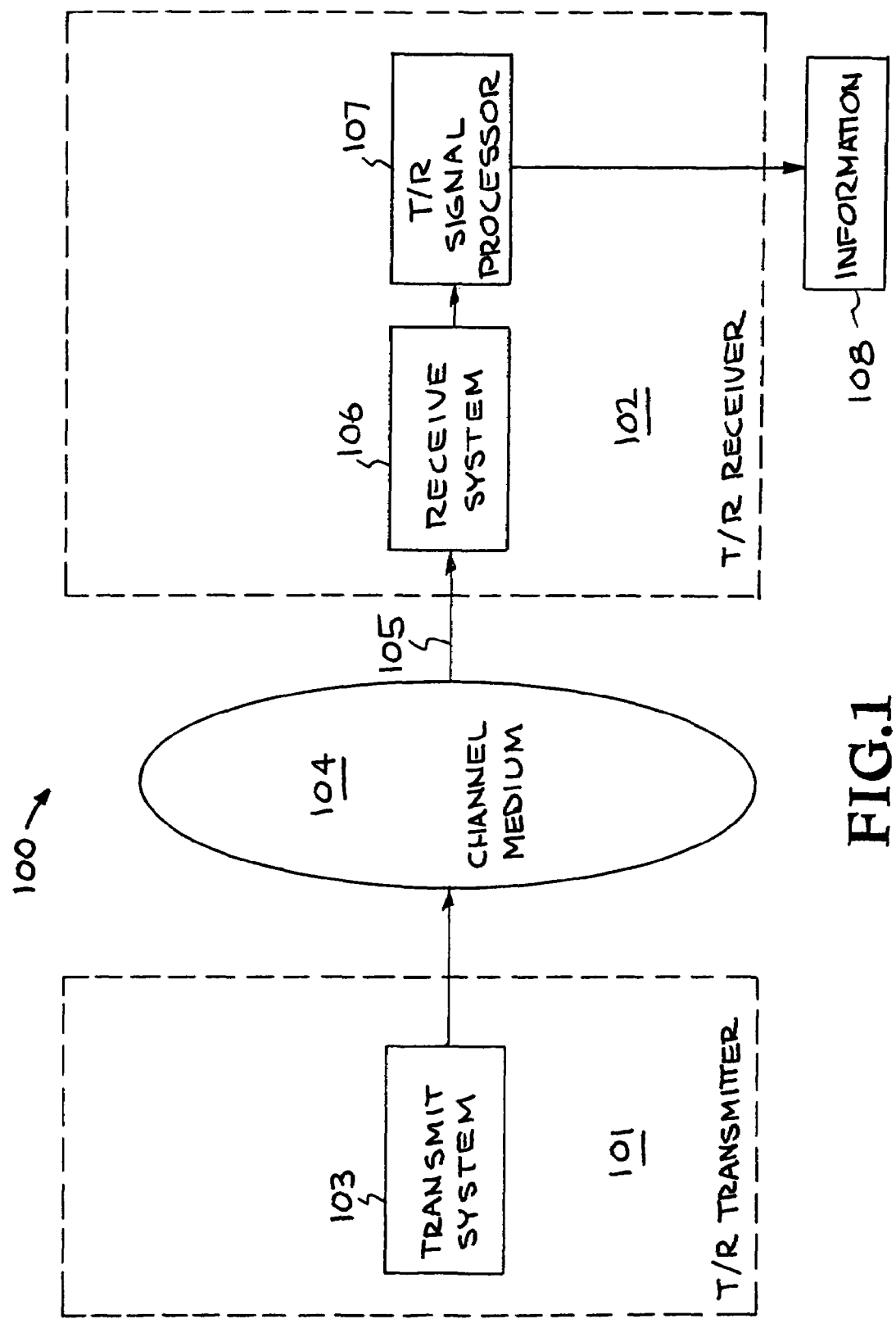
FIG. 1 illustrates an embodiment of a communications system using time reversal.

Referring now to the drawings, to the following information, and to incorporated materials; detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Communicating critical information over noisy channels in hostile environments whether they be a chaotic battlefield, or in disaster emergencies evolving from natural disasters like earthquakes, tornadoes or floods, or on the floor of a securities exchange, or even in the clandestine operations of national security—the data must be reliably received and extracted. A typical communications channel is subjected to a variety of noise and signal distortions, corrupting the fidelity of the information being transmitted, and reducing the effective capacity of the channel.

The present invention provides a communication system for transmitting a signal through a channel medium. The system comprises a transmitter adapted to transmit the signal, a receiver adapted to receive the signal, a digitizer that digitizes the signal, and a time-reversal signal processor adapted to time-reverse the digitized information signal. The channel medium may be air, earth, water, tissue, metal, and/or non-metal. In one embodiment the time-reversal signal processor is operatively connected to the transmitter.

In one embodiment the time-reversal signal processor is operatively connected to the receiver. In one embodiment the digitizer is operatively connected to the transmitter. In one embodiment the digitizer is operatively connected to the receiver. In one embodiment the time-reversal signal processor and the digitizer are operatively connected to the transmitter. In one embodiment the time-reversal signal processor and the digitizer are operatively connected to the receiver.

One embodiment includes a signal processor adapted to estimate Green's function of the channel medium. One embodiment includes a signal processor adapted to determine Green's function of the channel medium. One embodiment includes means for transmitting a pilot signal through the channel medium. One embodiment includes means for estimating a pilot signal, as it would be transmitted through the channel medium. One embodiment includes means for transmitting a pilot signal through the channel medium, means for estimating a pilot signal as it would be transmitted through the channel medium, and means for comparing the pilot signal and the estimated pilot signal. One embodiment includes a multiplicity of at least one of the transmitters and receivers. One embodiment includes a multiplicity of link stations operatively connected to at least one of the transmitters and receivers. One embodiment includes a communications array. One embodiment includes a communications array operatively connected to the transmitter. One embodiment includes a communications array operatively connected to the receiver. One embodiment includes a communications array operatively connected to the transmitter and a communications array operatively connected to the receiver.

Referring now to FIG. 1, an embodiment of a communications system using time reversal is illustrated. The system is designated generally by the reference numeral 100. The communications system 100 provides a time reversal communication system for communicating critical information over noisy channels in a hostile environment. The system 100 uses time reversal signal processing (TRSP) that compensates the transmission channel while mitigating the need for detailed prior knowledge of the channel characteristics. The TRSP increases channel bandwidth, thereby enabling the proportional increase in the volume of information. This is important in many situations such as battlefield communications, inner-city wireless communications, ultrahigh bandwidth wireless networks, and other environments. The system 100 has many uses, for example it can be used for improving communications, for secure communications, for battlefield communications, for inner-city wireless communications, for ultrahigh bandwidth wireless networks, for communicating information over noisy channels in a hostile environment, and other applications.

The communications system 100 applies time-reversal (TR) to mitigate the deleterious effects of a noisy communications channel in a hostile noisy environment including single and multi-channel situations. Undesirable characteristics of a typical communications channel are the frequency dependent attenuation of any transmitted signal, the corruption of a signal in noise, and the distortion effects caused by effects of echoes and reverberation or multipath. Unlike most other characteristics that corrupt a communications channel, the detrimental effects of multipath cannot be overcome by merely increasing the transmitted power. Multipath is an important factor in the deterioration of communication channels. Although the power in every signal diminishes as a function of the distance between the transmitter and receiver, multipath can create destructive interference resulting in a loss of received power in a very localized area. This localized loss of power is often referred to as fading. Multipath can further reduce the effectiveness of a channel by increasing the inter-symbol interference. Inter-symbol interference is the condition where, although the received signal has sufficient power, the receiver is confused by the simultaneous arrival of two different symbols.

One of the advantages of a time-reversal processor is the ability to incorporate the multipath return and actually use it to increase signal to noise ratio. By merely time reversing the array signal and summing them it is possible to obtain an enhanced information packet (in this case a pulse) that can eventually be recovered at the receiver.

The communications system 100 utilizes an approach based on a "time-reversal processor" (TRP). Time-reversal is the dynamic broadband analog of the well-known phase conjugate mirror used to focus narrowband monochromatic waves. This same basic reversal principle holds in digital signal processing in two-pass digital filter design in which a signal is filtered, reversed and refiltered to provide an enhanced signal with the phase preserved indicating a zero-phase filter response. From the signal processing perspective the TRP represents the "optimal" spatio-temporal matched filter in the sense of maximizing the output signal-to-noise ratio (SNR). It is essentially a technique, which can be used to "remove" the aberrations created by an inhomogeneous or random channel. TRP can be used to decode transmitted information into the channel without requiring a detailed channel model required by all other model-based schemes.

The communications system 100 utilizes a "point-to-point" time-reversal (T/R) receiver to recover an information sequence or code from a set of receiver measurements in a highly reverberant, temporally stationary environment. It should be noted that the technique is available for arrays of sensors on both the transmit and receive "sides" of the medium and the theory and implement incorporating sensor arrays is simple following the information herein. The description of the communications system 100 is initially based on the point-to-point case. The array implementation will be discussed subsequently.

The applicability of time-reversal processing to the communications problem without the need to model the channel medium explicitly is a tantalizingly important property, since most media are unknown, random and temporal coherence degrades significantly. A TR processor simply processes the transmitted time series (which can be multi-channel using an array) from the channel under investigation. Next it collects the array data, digitizes, time-reverses the temporal (array) signals and re-transmits them back through the medium to remove channel distortions.

The basic principle of time reversal processing, in its simplest form, can succinctly be characterized by the following. Consider the spatio-temporal propagation of source information, $i(r_o,t)$ located at $r_o$ and time t through a channel medium characterized by the channel Green's function (impulse response) $C(r,r_o;t)$. We also define the channel Green's function as, $g(r,r_o;t)$, from the source to location. Note that we will use these functions interchangeably throughout this disclosure. From systems theory, we know that this operation is given by convolution to yield the received signal, that is, $$R(r, t) = C(r, r_o; t) * i(r_o, t) \overset{F}{\Leftrightarrow} R(r, \omega) = C(r, r_o; \omega)I(r_o, \omega),$$ (Equation 1)

where the applicants have also shown the equivalent Fourier transform representation. Based on the underlying theory, applicants "re-transmit" or "back-propagate" from r, through the channel, back to the original source position at $r_o$, and choose to transmit the time-reversed signal, R(r,−t), then $$\hat{i}(r_o, t) =$$ (Equation 2)
$$C(r_o, r; t) * R(r, -t) \overset{F}{\Leftrightarrow} \hat{I}(r_o, \omega) = C(r_o, r; \omega)R^*(r, \omega),$$

utilizing the Fourier transform conjugation property. But substituting the reversed signal into this equation and invoking the Reciprocity Theorem ($C(r_o,r;t) \equiv C(r,r_o;t)$) interchanging source and receiver position gives $$\hat{i}(r_o, t) = C(r_o, r; t) * C(r_o, r; -t) * i(r_o, -t) \overset{F}{\Leftrightarrow} \hat{I}(r, \omega) =$$ (Equation 3)
$$|C(r, r_o; \omega)|^2 I^*(r_o, \omega),$$

which implies that the reversed signals re-transmitted through the medium will "focus" the enhanced energy (with gain K) back to the original source position with no change in phase because of the magnitude-squared channel Green's function, that is, $$\hat{I}(r_o,\omega) \propto K(\omega)I(r_o,\omega),$$ (Equation 4)

precisely demonstrating the broadband version of phase conjugation. Clearly, this relation is more complicated, and more sophisticated representations include sensor transfer functions, noise, etc. Knowledge of the detailed channel Green's function is not required (no modeling) explicitly. This simple property can be extended to random media. Next the applicants describe how the TR principle can be applied to the communications problem.

The basic communications problem has been solved based on the following well-known formulation. The detection of a transmitted information sequence can be transformed to the problem of maximizing the output signal-to-noise ratio, $SNR_{out}$, at the receiver of a communications system. The underlying system model for the communications problem is given by $$z(t) = s_{out}(t) + n_{out}(t) = g(r;t) * [s(t) + n(t)],$$ (Equation 5)

for z(t), the noisy measurement, $S_{out}(t)$, the output signal consisting of the convolution of s(t), the transmitted signal (information) and g(r;t), the spatio-temporal channel Green's function response. Note here we use g(r;t) instead of C(r;t) the previous discussion. The output noise, $n_{out}(t)$, is also the convolution of the input noise, n(t), an additive random (white) zero mean, noise of variance, $\sigma_n^2$. The matched-filter problem based on the model of Equation 5 is given a "known" signal, s(t), in additive white noise, find the filter response, f(t), that maximizes the $SNR_{out}$ defined by $$\max_f SNR_{out} \equiv \frac{\xi_{s_{out}}}{E\{n_{out}^2(t)\}} = \frac{|f(t)*s(t)|^2}{\sigma_{n_{out}}^2}, \quad \text{(Equation 6)}$$

for $\xi_{s_{out}}$ defined as the output signal energy. For time reversal, the matched-filter in additive white noise is identical to that posed above with a "known" Green's function of the channel medium replacing the known signal. The channel Green's function, $g(r,r_o;t)$, is the result of a point-to-point communication link between a station (source) at $r_o$ to a master station (receiver) at r. In this case, the matched-filter solution is found by maximizing, $SNR_{out}$, leading to the modified numerator $$|f(t)*g(r;r_o;t)|^2 \leq \xi_f \times \xi_g, \quad \text{(Equation 7)}$$

that is satisfied with equality at some time T, if $$f(t)=g(r;r_o;T-t). \quad \text{(Equation 8)}$$

Thus, for T/R, the optional matched-filter solution is the time-reversed channel Green's function from the link station-to-master station (source-to-receiver) or visa versa. Comparing these results with the usual matched-filter solution above, the Green's function of the channel is reversed rather than the transmitted replicant signal. Note that since T/R theory requires reciprocity, these results are valid for both transmission and reception, that is, $g(r,r_o;T-t) \leftrightarrow g(r_o,r;T-t)$. Note also that when an array is included to sample the spatial field or transmit a wave, then these results include the focus at link station (source) position, $r_o$, yielding the optimal, spatio-temporal matched-filter solution, $g(r_l,r_o;T-t)$ at sensor position, $r_l$.

With this T/R information in hand, the communications system 100 utilizes a set of realizations of the T/R communications system that can be implemented to solve the point-to-point communications problem. The T/R operation can be performed either on transmission or reception using the channel Green's function or a known pilot signal. Generically, the basic T/R communication system is shown in FIG. 1 and is embodied by the system 100. Here the information signal is transmitted by transmitter 103 of the T/R transmitter system 101 into the channel medium 104 where it is available for the T/R receiver system 102 at 105. It is then digitized in receiver 106 for T/R processing in 107 where the transmitted information signal at 103 is recovered at the link station at 108.

The first realization is probably the most advantageous by performing T/R during transmission thereby mitigating the effects of the medium directly. Mathematically, the following measurements are defined as: the pilot and the information. The pilot measurement is defined as $$z_p(t)=g(r;t)*p(t), \text{ [Pilot]} \quad \text{(Equation 9)}$$

where $z_p$ is the pilot measurement, which can also be contaminated with additive noise; g is the spatio-temporal Green's function of the channel; and, p is the known, transmitted pilot signal. The purpose of the pilot in this case, as well as that of equalization, is to estimate the Green's function which is used in the final receiver design to mitigate the distortion effects created by the channel medium and unknown transfer characteristics of the measurement system. The pilot is not only used to estimate the Green's function, but also to implement the receiver by convolution as will be discussed below.

The information measurement is defined by $$z_i(t)=g(r;t)*i(t), \text{ [Information]} \quad \text{(Equation 10)}$$

where $z_i$ is the information measurement; and, i is the transmitted information signal.

Realizations of the T/R receiver on transmission follows directly from linear systems theory and the following two cases are considered: one using the Green's function of the channel medium, and one using the pilot measurement.

Figure 2:
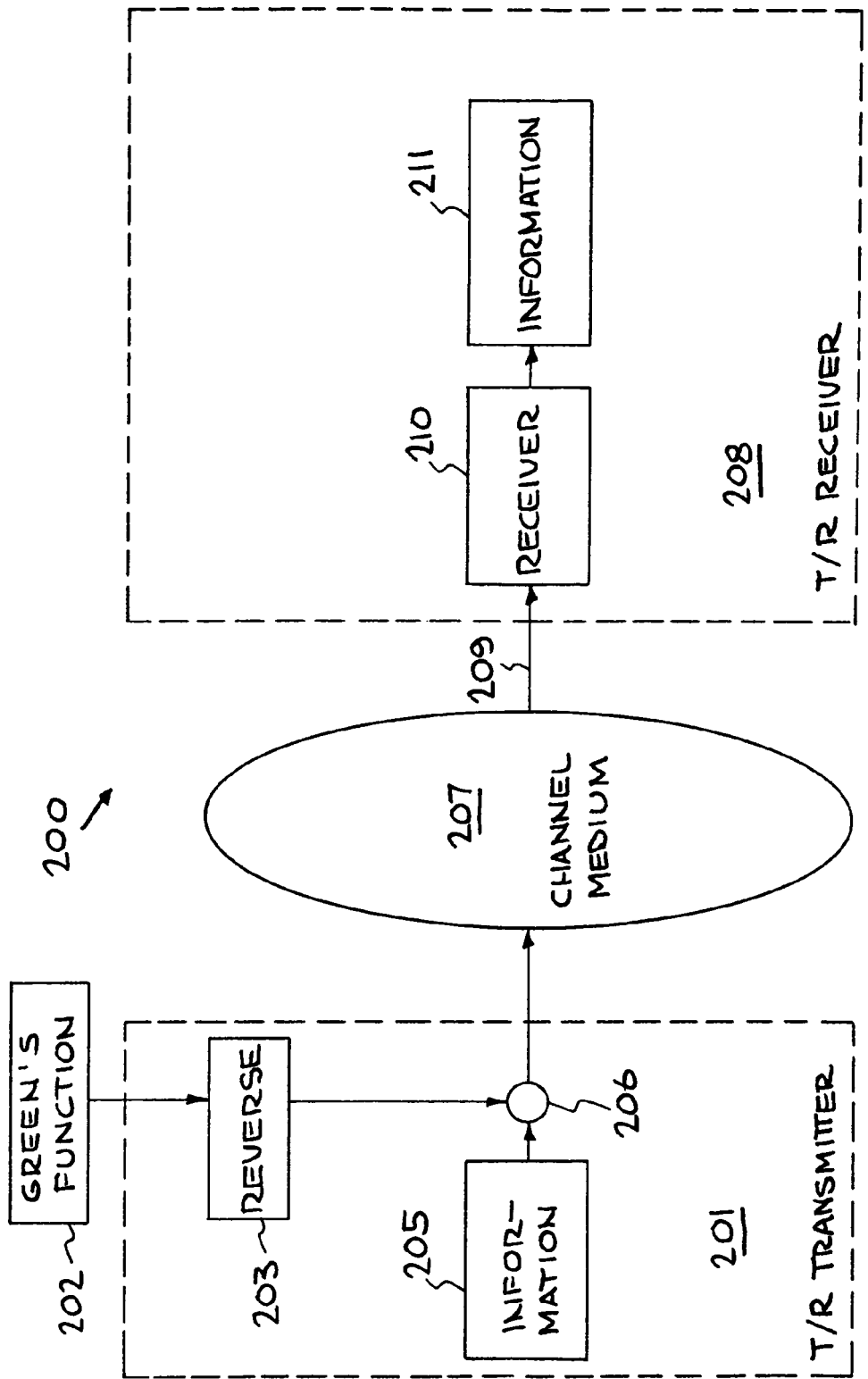
FIG. 2 illustrates another embodiment of a communications system using time reversal.

The T/R Transmission Based Receiver 200 using the channel Green's function on transmission is shown in FIG. 2 and is Realization No. 1 of the set of T/R receivers. For the T/R Transmitter 201, the channel Green's function 202 is first estimated, reversed digitally 203, and convolved 206 with the information signal 205 for transmission through the channel medium 207. On reception, the input 209 to the T/R receiver is defined as $z_{igX}(t)$ with the subscript representing the information signal (i), convolved with the Green's function, (g), on transmission (X) is digitized (A/D converter) in the receiver 210 of the T/R Receiver 208. Therefore, we have that the measured, digitized signal $$z_{igX}(t)=z_i(t)*\hat{g}(r;-t)=g(r;t)*\hat{g}(r;-t)*i(t)=C_{gg}(t)*i(t), \quad \text{(Equation 11)}$$

where $C_{gg}(t)$ is the correlation function and therefore, the output 211 of the T/R receiver is simply $$R_{igX}(t)=z_{igX}(t) \quad \text{(Equation 12)}$$

Clearly, if $C_{gg}(t) \approx C_{gg}(t)$ and $C_{gg}(t)$ is impulsive, then i(t) is recovered directly by this realization. However, in reality, we have the autocorrelation function, $C_{gg}(t)$, that acts as a window function filtering or smearing i(t). It is also interesting to note with this particular realization that if a sensor array replaces the single sensor transmitter used for point-to-point communications, then the optimal spatial-temporal matched-filter is additionally achieved with the added gain in SNR afforded by the array as well as the focusing capability of the T/R operation. Next we consider a second realization using a similar structure.

Figure 3:
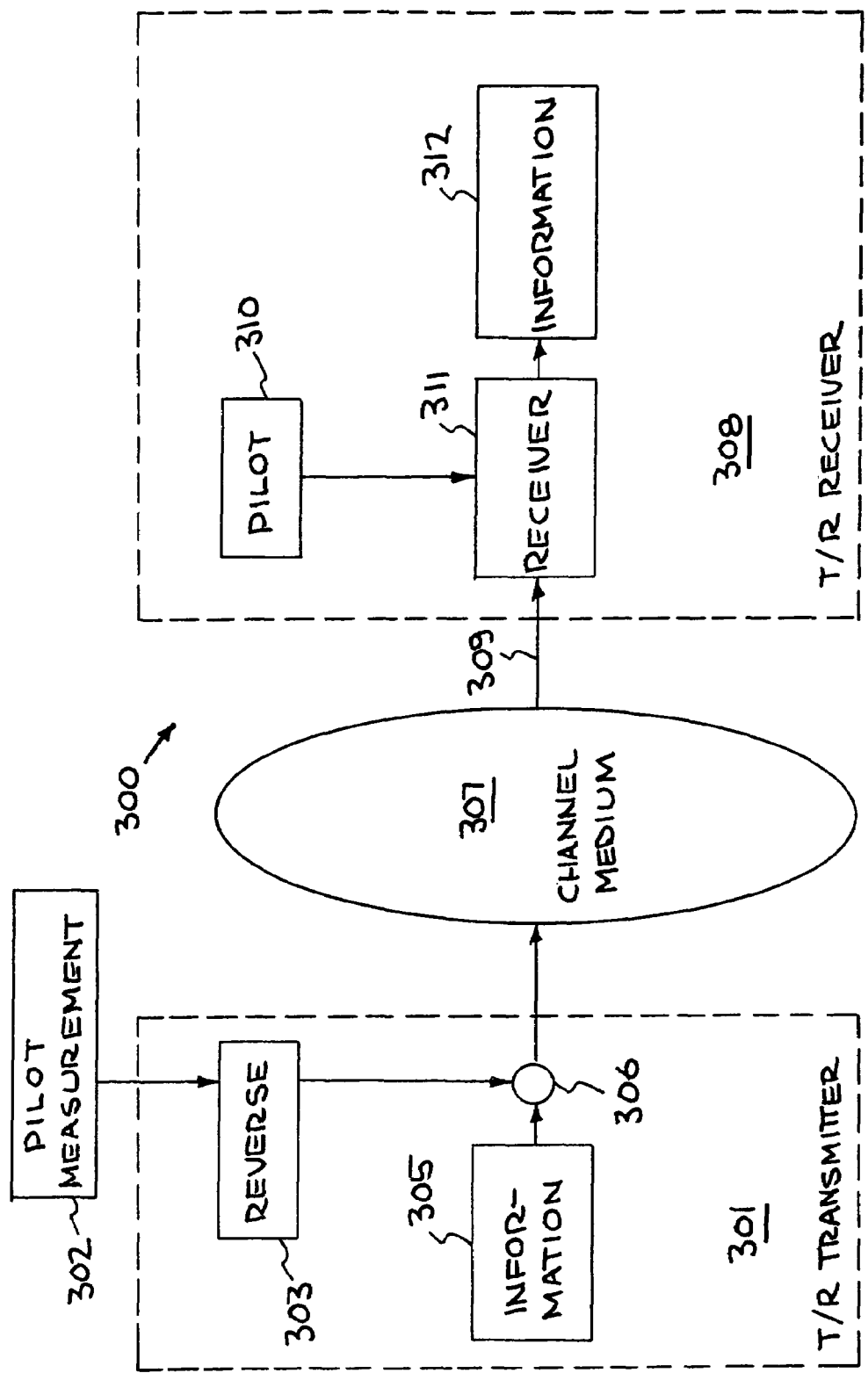
FIG. 3 illustrates another embodiment of a communications system using time reversal.

The T/R Transmission Based Receiver 300 using the pilot measurement on transmission is shown in FIG. 3 and is Realization No. 2 of the set of T/R receivers. It is an alternate realization of the T/R receiver using the pilot measurement. Here for the T/R Transmitter 301 a known pilot signal measurement 302 is selected to excite the channel medium providing, $z_{ip}(t)$, which is reversed 303 and convolved 306 with the information signal 305 on transmission through the channel medium 307 to generate, $z_{ipX}(t)$, as input 309 to the T/R receiver 310 defined by $$z_{ipX}(t)=z_i(t)*z_p(-t)=C_{gg}(t)*p(-t)*i(t). \quad \text{(Equation 13)}$$

Convolution 311 with the known pilot signal 310, p(t), is therefore necessary to recover the information at the output 312 of the receiver given by $R_{ipR}(t)$, that is, $$R_{ipX}(t)=z_{ipX}(t)*p(t)=C_{gg}(t)*C_{pp}(t)*i(t), \quad \text{(Equation 14)}$$

where again if both $C_{gg}$ and $C_{pp}$ are impulsive, i(t), is recovered directly. Realistically, we can think of the information signal as being filtered or smeared by both.

Next realizations of T/R receiver on reception are considered. Again two cases are considered: one with the Green's function and one with the pilot measurement.

Figure 4:
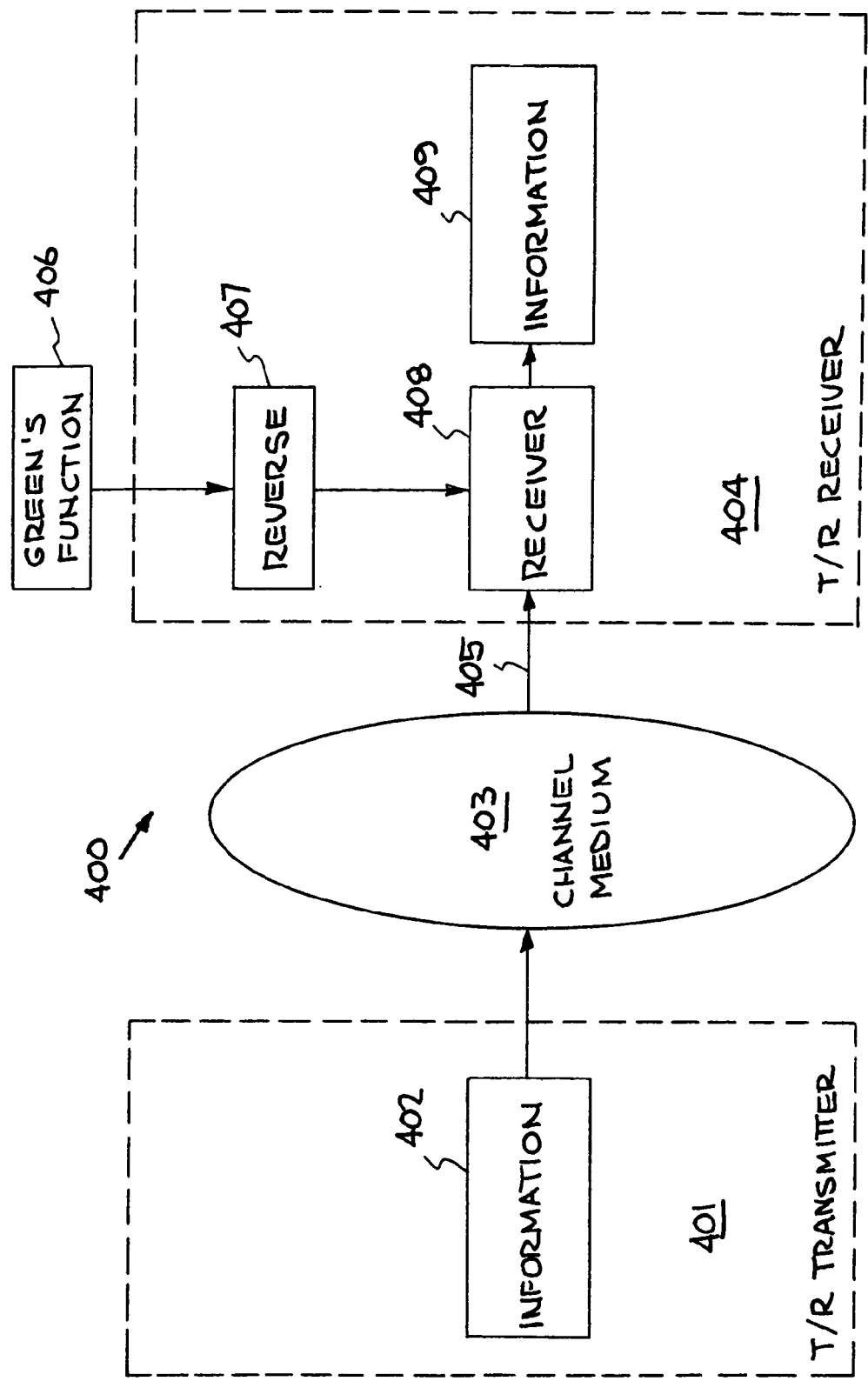
FIG. 4 illustrates another embodiment of a communications system using time reversal.

Realization No. 3 of the set of T/R receivers is the T/R Reception Based Receiver 400 with channel Green's function on reception is shown in FIG. 4. The T/R Transmitter 401 transmits the information signal 402 through the channel medium 403 resulting in the received measurement 405. On reception, the estimated Green's function 406 is reversed 407 and convolved 408 with the receiver input 405, $z_i(t)$, to give the T/R receiver 404 output 409 as $$R_{igR}(t) = z_i(t) * g(r;-t) = C_{gg}(t) * i(t), \quad \text{(Equation 15)}$$

which is mathematically identical to $R_{igX}(t)$ with the exception that the mitigation of the channel medium 403 is performed on reception. This realization is subject to more uncertainty and noise created by the medium itself or external noise on transmission through the medium. Finally, we consider the case of using the pilot measurement on reception.

Figure 5:
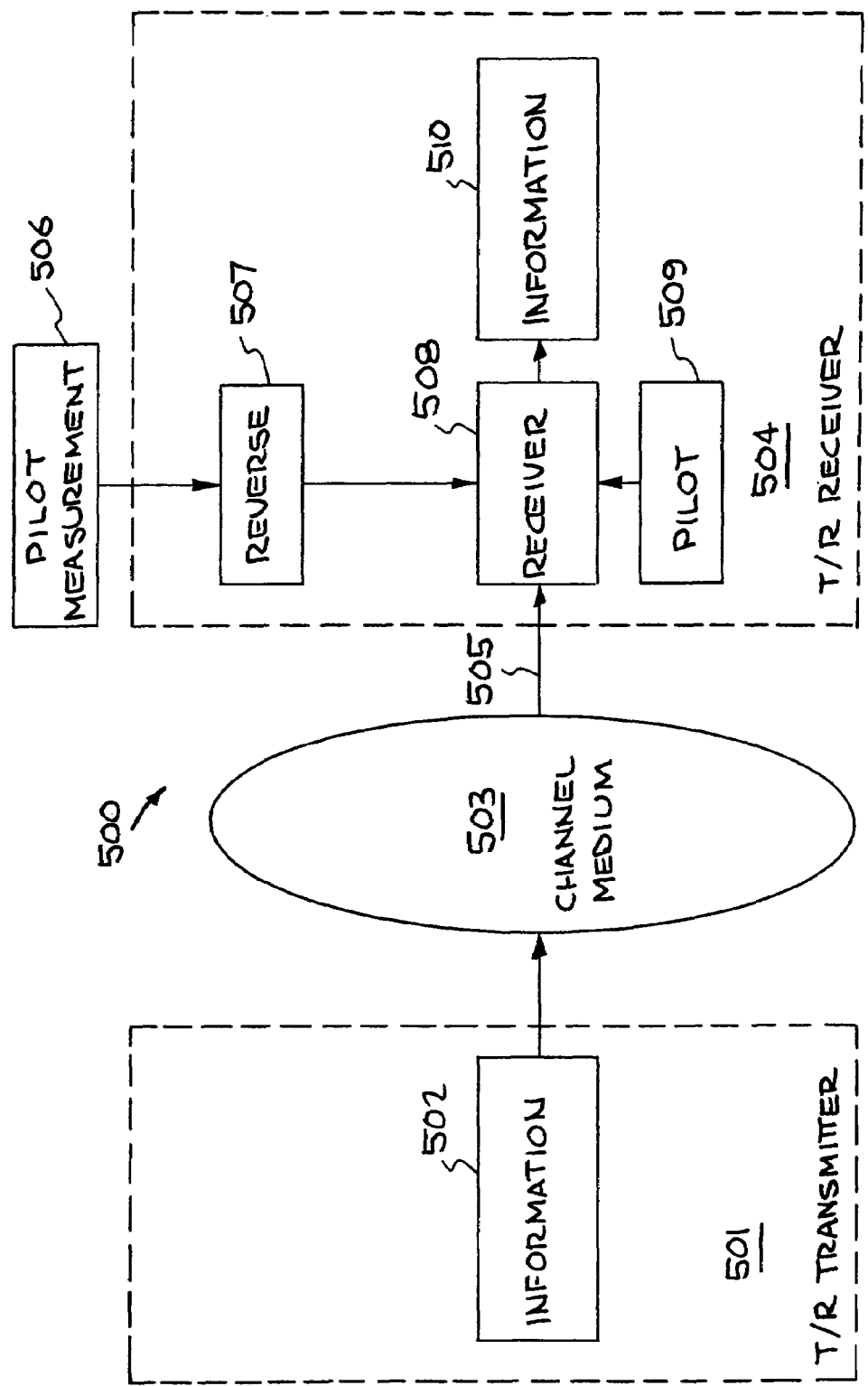
FIG. 5 illustrates another embodiment of a communications system using time reversal.

Realization No. 4 of the set of T/R receivers is the T/R Reception Based Receiver 500 with pilot measurement 509 on reception is shown in FIG. 5. As in the previous case, the T/R Transmitter 501 transmits the information signal 502 through the channel medium 503 resulting in the received measurement 505. We start with the receiver input 505 and convolve 508 it with the reversed 507 pilot measurement 506 as well as the known pilot signal 509 to generate the T/R receiver 504 output 510, $R_{ipR}(t)$, where $$R_{ipR}(t) = z_i(t) * z_{ip}(-t) * p(t) = C_{gg}(t) * C_{pp}(t) * i(t), \quad \text{(Equation 16)}$$

which is mathematically equivalent to $R_{ipX}(t)$, but with the potential uncertainty problems discussed in Realization No. 3 above.

One of the critical steps in the implementation of any communications receiver is how it "equalizes" or attempts to remove the deleterious effects of mitigating the channel medium (Green's function). For Realization No. 1 and No. 3, the estimated Green's function is required before the receiver can be constructed. Here the applicants discuss some approaches to estimate the Green's function from noisy received data. As discussed previously, the channel Green's function is an integral part of the two T/R receiver realizations. It can be estimated from the pilot measurement of Equation 9 and is similar to the operations used for equalization, but is much better conditioned numerically for solution, since the forward rather than the inverse filter is required for T/R. The estimated Green's function is used in the realizations to mitigate the distortion effects created by the channel medium and unknown transfer characteristics of the measurement system. We describe two methods of obtaining the required pilot measurements in FIG. 6. Since reciprocity holds, the pilot can be transmitted from either the transmission or reception side of the implementation to obtain the measured data for processing.

The estimate, $\hat{g}(r;t)$, is obtained using the optimal Wiener solution obtained from the pilot measurement by solving $$\min_g J = E\{\varepsilon^2\} \text{ for} \quad \text{(Equation 17)}$$

$$\varepsilon(t) \equiv z(t) - \hat{z}(t) = z(t) - \hat{g}(r;t) * p(t),$$

and $\varepsilon$ is defined as the output error. The solution of this problem leads to the well-known Wiener filter given by $$\hat{g} = C_{pp}^{-1} c_{zp}, \quad \text{(Equation 18)}$$

where $C_{pp}$ is a M×M correlation matrix and $c_{zp}$ is a M-cross correlation vector with $$\hat{z}(t) = \hat{g}(r;t) * p(t) = \sum_{m=0}^{M-1} \hat{g}(r;m) p(t-m) = \hat{g}^T p(t), \quad \text{(Equation 19)}$$

for

-continued $$\hat{g}^T \equiv [\hat{g}(r;0) \ldots \hat{g}(r;M-1)] \text{ and}$$

$$p^T(t) \equiv [p(t) \ldots p(t-M+1)].$$

Since the correlation matrix of Equation 18 is Toeplitz, we choose to use the Levinson-Wiggins-Robinson (LWR) recursion to efficiently perform the inversion (order $M^2$).

Pragmatically, a more efficient method to estimate the Green's function is using a chirp input to excite the channel medium. Here the chirp is simply a frequency-modulated signal that is swept over the presumed bandwidth of the channel. We use the fact that the auto-correlation of a signal is the convolution with itself time reversed, $(C_{xx}(t) = x(t) * x(-t))$. Therefore, if we convolve the pilot signal measurement, $z_p(t)$, with the reversed pilot signal for the $l^{th}$-channel, that is, $$\hat{g}_l(r;t) = z_p(t) * p_l(-t) = [g_l(r;t) * p_l(t)] * p_l(-t) = g_l(r;t) * C_{pp}(l), \quad \text{(Equation 20)}$$

then if the pilot signal has an impulse-like correlation, that is, $$\hat{g}_l(r;t) \approx g(r;t) \text{ for } C_{pp}(t) \to \delta(t),$$

the Green's function can be approximately estimated. This is the reversed pilot signal approach to Green's function estimation. Note that one candidate pilot signal is a chirp that approximately satisfies the impulsive-like auto-correlation function property and samples the medium only within the information bandwidth. It is well-known that the autocorrelation of a chirp closely approximates and impulse; therefore, when used in the T/R Receiver Realizations No. 2 (FIG. 3) and No. 4 (FIG. 5) the resulting outputs are much simpler and produce the desired results.

Figure 6:
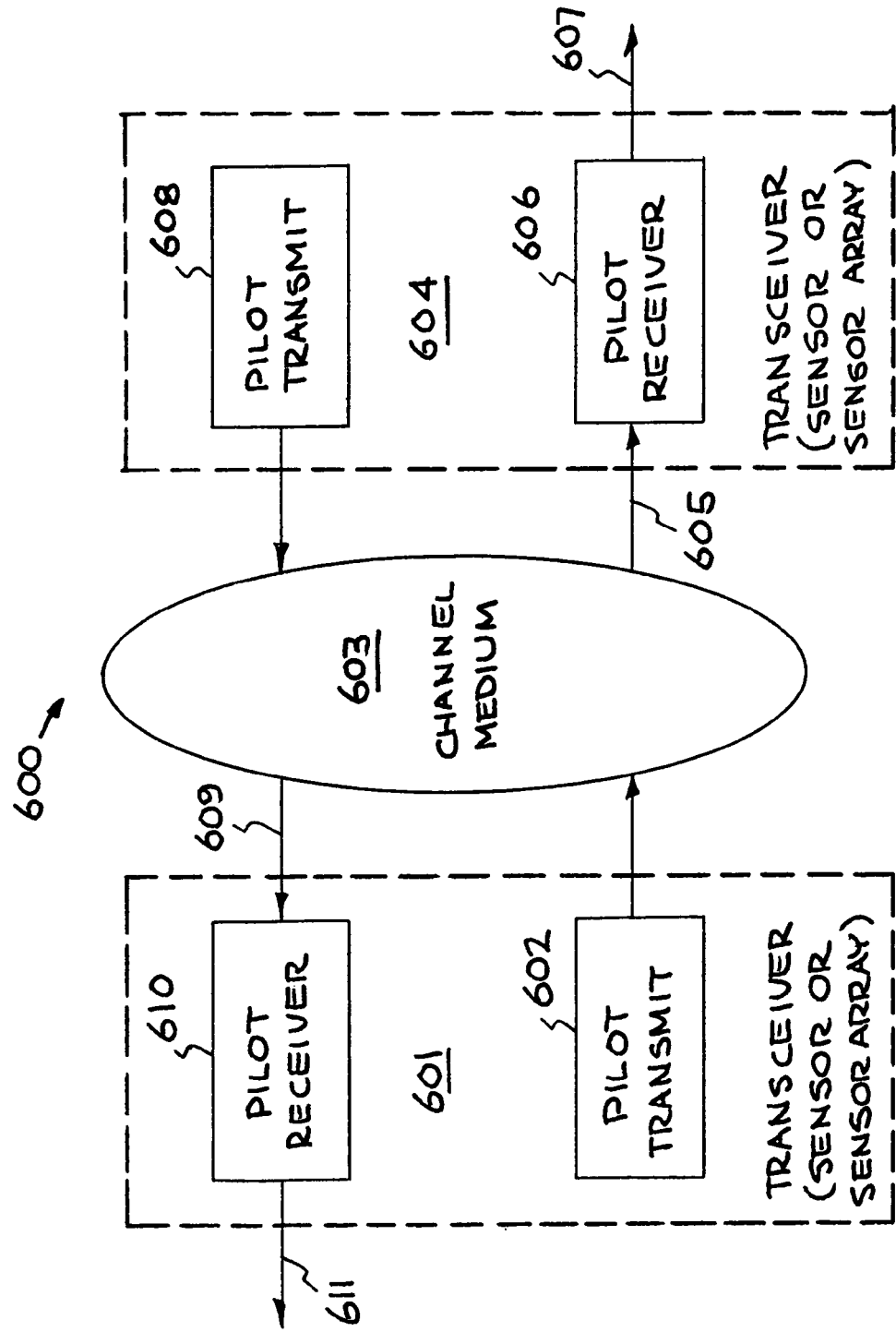
FIG. 6 illustrates another embodiment of a communications system using a pilot signal.

The implementation of the "pilot measurement" data acquisition system 600 is shown in FIG. 6. On the transmission side, Transceiver 601 transmits the pilot 602 through the channel medium 603 to the reception Transceiver 604 where the measurement 605 is digitized in the Pilot receiver 606 and output 605 for further processing at the Link station. Depending on the application, it may be desirable to have the Link station perform the pilot transmission. In this case the pilot 608 is transmitted from the Transceiver 604 through the medium 603 where the measurement 609 is received on Transceiver 601 is digitized in the Pilot receiver 610 and output 611 for processing at the Master station.

Referring again to FIG. 1, additional details of the components of the system 100 will be described. The T/R transmitter 101 includes a Transmit System 103. The Transmit System 103 comprises a code generator, digitizers (A/D and D/A), amplifier, microprocessor (convolution), reverser (FIFO shift register) and other data (e.g., pilot, pilot measurement, etc.). Channel Medium 104 is the channel over which the information is to be sent and is characterized by its Green's function. The T/R Receiver 102 comprises of the Receive System 106 and T/R Equalizer 107. The Receive System 106 comprises an amplifier and filter, digitizer and matched-filter for synchronization. The T/R Equalizer 107 comprises a microprocessor (convolution), reverser (FIFO shift register) and other data (e.g., pilot, pilot measurement, etc.).

Referring again to FIG. 1, an embodiment of a basic T/R Communication system 100 using any of the possible realizations discussed above or for that matter any realization using the time reversal approach consists of a T/R Transmitter 101 including a Transmit system 103 which may include the estimated Green's function in its implementation, a digitizer, and an information code generator as well as a microprocessor to perform convolution on transmission 103 when required. After the information code is transmitted 103 from the T/R Transmitter 101 through the channel medium 104 it is received 105 on the T/R Receiver 102, digitized and processed (bandpass filtered) 106 and the processed using any device (e.g., microprocessor) to perform the receiver functions 107 producing the output information 108.

Figure 7:
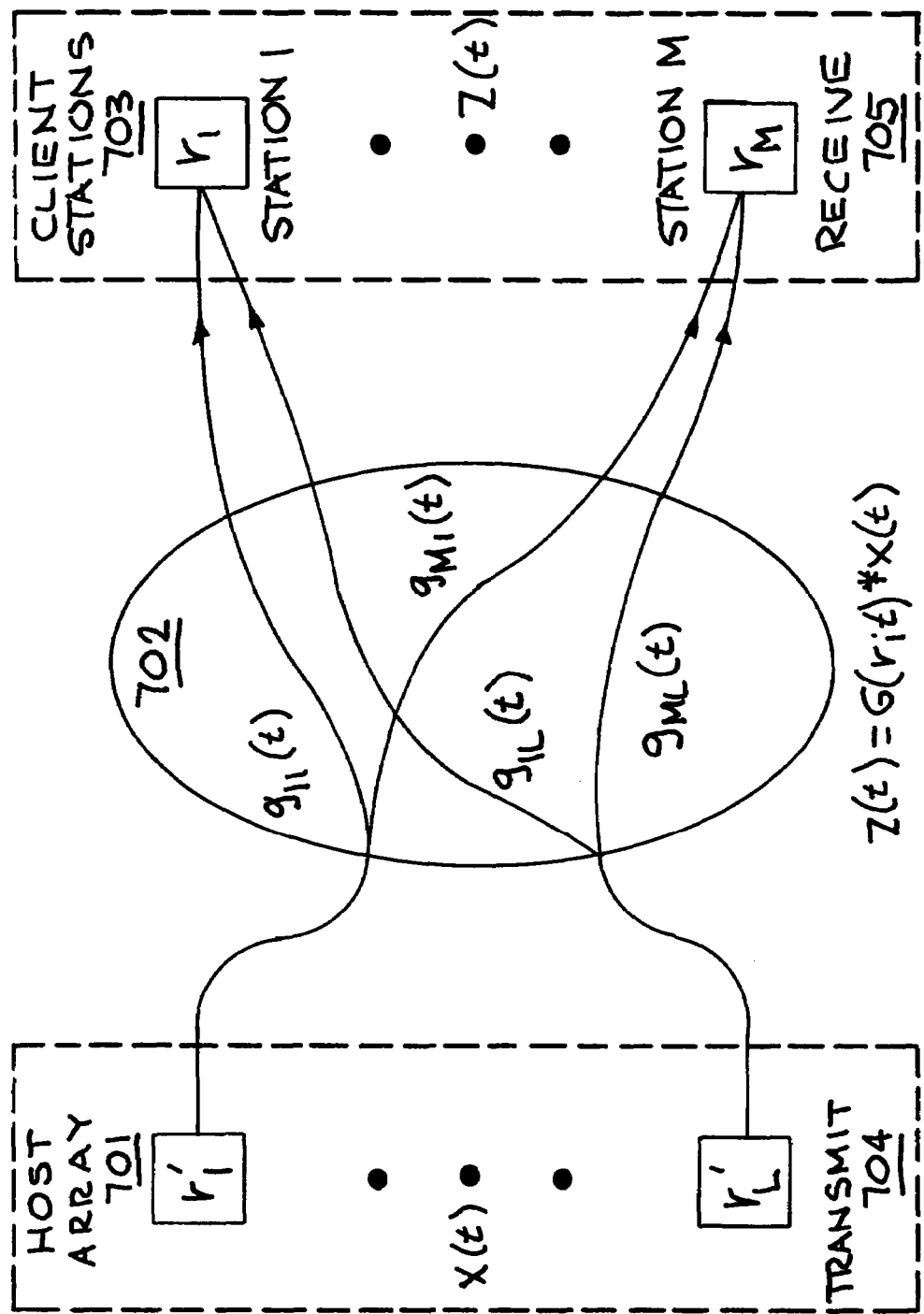
FIG. 7 illustrates another embodiment of a communications system using time reversal arrays.

With this information in mind consider the operation of the time-reversal receiver in a battlefield or, maybe even more hostile, a securities exchange environment, the ability to focus through the medium is an interesting and fundamental property of the TRSP. Next we discuss the capability of the T/R approach using a T/R communications array. Define the field received at the $m^{th}$-station spatially located at $r_m$ and at time t by the spatio-temporal signal, $z(r_m;t)$ and the excitation signal transmitted from the $l^{th}$ array element spatially located at $r'_l$ and t by $x(r'_l;t)$. The transmitted signal propagates through the time invariant medium characterized by its impulse response or equivalently Green's function, $g(r_m,r'_l;t)$, representing the propagation medium from the excitation signal (source array sensor) to the receiver station. This spatio-temporal propagation relation can be written compactly as $$z(t)=G(r;t)*x(t),\quad\text{(Equation 21)}$$

where $z\in C^{M\times 1}$ is the received signal at all of the M stations, $x\in C^{L\times 1}$ is the information or message signal transmitted by the array into the medium represented by its transfer (impulse response) matrix, $G\in C^{M\times L}$ consisting of the channel impulse responses or equivalently Green's function, $g(r_m,r'_l;t)$, from the $l^{th}$-transmit array sensor element to the $m^{th}$-receiver station. More compactly, if we define $$g_{ml}(t)\equiv g(r_m,r'_l;t)\quad\text{(Equation 22)}$$

then the propagation relation can be rewritten in the standard vector-matrix format where the indices identify the spatial path vector locations, that is, $(r_m,r'_l)\to(m,l)$ as depicted in FIG. 7. Here we define the host as the transmitting array and the clients as the receiving stations. The spatio-temporal propagation of Equation 21 can now be expressed in terms of L-dimensional row vectors to give $$z(t)=\begin{bmatrix}g_1^T(t)\\\vdots\\g_M^T(t)\end{bmatrix}*x(t)=\begin{bmatrix}g_1^T(t)*x(t)\\\vdots\\g_M^T(t)*x(t)\end{bmatrix}.\quad\text{(Equation 23)}$$

Here vector-matrix operations hold with the convolution operator replacing the usual multiplication operator, that is, $$x^T(t)*y(t)\equiv[x_1(t)\ \ldots\ x_N(t)]*\begin{bmatrix}y_1(t)\\\vdots\\y_N(t)\end{bmatrix}=$$

$$\sum_{i=1}^N x_i(t)*y_i(t)\ [\text{inner convolution}]$$

where the set of row vectors, $g_m^T(t)$, define the propagation path of the transmitted signals from the array to the $m^{th}$-client station as depicted in FIG. 7. At the $m^{th}$-client station the data received from the transmit array is therefore $$z_m(t)=g_m^T(t)*x(t)=\sum_{l=1}^L g_{ml}(t)*x_l(t)\quad\text{(Equation 24)}$$

With this in mind we briefly discuss the multi-channel implementation of the four (4) receiver types developed earlier.

T/R RECEIVER I: The T/R I receiver realization is based on transmitting the time reversed, estimated Green's functions convolved on each array sensor channel with the information signal to the $m^{th}$-client receiver station. In this realization the transmitted code is given by $$x(t)=\hat{g}_m(-t)\otimes i(t)=\begin{bmatrix}\hat{g}_{m1}(-t)*i(t)\\\vdots\\\hat{g}_{mL}(-t)*i(t)\end{bmatrix},\quad\text{(Equation 25)}$$

where $\otimes$ is defined as the Kronecker convolution operator (element-by-element multiply) yielding a L×1 complex vector. Therefore from Equation 21, we have that the wave propagated from the transmit array through the medium is $$z_{i\hat{g}_m x}(t)=G(r;t)*x(t)=G(r;t)*\hat{g}_m(-t)\otimes i(t)),\quad\text{(Equation 26)}$$

with the subscript representing the information signal (i) convolved with the estimated Green's functions ($\hat{g}_m$) corresponding to the $m^{th}$-client station on transmission (X). This expression can be written as and shown to be:

$$z_{i\hat{g}_m X}(t)=\begin{bmatrix}g_1^T(t)\\\vdots\\g_M^T(t)\end{bmatrix}*(\hat{g}_m(-t)\otimes i(t))$$

$$=\begin{bmatrix}\overline{C}_{g_1\hat{g}_m}(t)\\\vdots\\\overline{C}_{g_M\hat{g}_m}(t)\end{bmatrix}\otimes i(t)\quad\text{(Equation 27)}$$

where the cross-correlations are defined by $$\overline{C}_{g_k\hat{g}_m}(t)\equiv\sum_{l=1}^L C_{g_k\hat{g}_m}(l;t)\ \text{for}$$

$$C_{g_k\hat{g}_m}(l;t)\equiv g_{kl}(t)*\hat{g}_{ml}(-t)\ \text{and}\ k=1,\ldots,M.$$

Therefore at the $k^{th}$-client receiver station, we have $$z_k(t)=z_{i\hat{g}_m X}(k;t)=\overline{C}_{g_k\hat{g}_m}(t)*i(t),\quad\text{(Equation 28)}$$

demonstrating that maximum coherence is achieved when k=m, matching the set of Green's functions to the appropriate client receiver, since the auto rather than cross correlation is achieved demonstrating that the transmitted wavefield satisfies the time-reversal focusing principle. The output of this realization, T/R I, at the receivers is simply, $R_{i\hat{g}_m X}(t)=z_{i\hat{g}_m X}(t)$ and over the entire communications network (M receiver stations) or at the $k^{th}$-client as (as before), $$R_{i\hat{g}_m X}(k;t)=z_{i\hat{g}_m X}(k;t)=z_k(t).$$

Next assume that we have transmitted a pilot signal into the medium to give $$z_p(t) \cdot G(r;t)*p(t) \quad \text{(Equation 29)}$$

where the pilot signal is simultaneously broadcast over each sensor channel and $z_p \in C^{M \times 1}$, $p \in R^{L \times 1}$ or where the pilot signals are different for each station, that is, $p(t) \rightarrow p_m(t)$. Therefore at the $m^{th}$-receiver station, we have that the received pilot signal is $$z_{p_m}(t) = g_m^T(t)*p(t) = \sum_{l=1}^{L} g_{ml}(t)*p_m(t). \quad \text{(Equation 30)}$$

Another scenario of importance is that in an open or cooperative communications environment (e.g., city) the client stations may simultaneously broadcast information to the host array, which from Equation 21 implies that $$x(t) = G^T(r;t)*z(t) \quad \text{(Equation 31)}$$

However, a more likely scenario is that each client station individually sets up its communication link with the host by broadcasting a signal, that is, $z(t) \rightarrow z_m(t)$ (a scalar); therefore, the signal received on the host array from the $m^{th}$-client would be $$x(t) = g_m(t)*z_m(t) \text{ for } m=1, \ldots, M \quad \text{(Equation 32)}$$

If, in fact, this is a known pilot signal from the $m^{th}$-station, then the host array receives the following signal $$x_{p_m}(t) = g_m(t)*p_m(t) \text{ for } m=1, \ldots, M \quad \text{(Equation 33)}$$

for $x_{p_m}$, $g_m(t) \in C^{L \times 1}$ and $p_m$ a scalar. Now with this information in mind we consider another T/R receiver realization based on these pilot signal measurements.

T/R RECEIVER II: Analogous to T/R Receiver I, we replace the reversed L-dimensional Green's functions estimate of Equation 26 with the reversed, L-dimensional pilot signal measurement ($x_{p_m}$) of Equation 33 received from the $m^{th}$-receiver station shown in FIG. 3. Here the measurement is convolved with the information signal and then broadcast into the medium to generate the wavefield vector, $$z_{ipX}(t) = G(r;t)*x(t) = \begin{bmatrix} g_1^T(t) \\ \vdots \\ g_M^T(t) \end{bmatrix} * (x_{p_m}(-t) \otimes i(t)). \quad \text{(Equation 34)}$$

Performing the same operations as in Equation 27, we have $$z_{ipX}(t) = \begin{bmatrix} \overline{C}_{g_1 g_m}(t) \\ \vdots \\ \overline{C}_{g_M g_m}(t) \end{bmatrix} \otimes (p_m(-t)*i(t)). \quad \text{(Equation 35)}$$

Thus, the receiver at the $m^{th}$ station is $$R_{ip_m X}(t) = z_{ip_m X}(t)*p_m(t) = \overline{C}_{g_m g_m}(t)*C_{p_m p_m}(t)*i(t), \quad \text{(Equation 36)}$$

to recover the desired information.

T/R RECEIVER III: The realization for this receiver is also similar to that of T/R Receiver I; however, the reversed client receiver station set of Green's functions is performed on reception rather than transmission. Starting with the receiver input from the transmitted wavefield of Equation 27 as $$z_m(t) = g_m^T(t)*i(t), \quad \text{(Equation 37)}$$

and convolving it with the estimated reversed Green's functions, we obtain $$R_{i\hat{g}_m R}(t) = z_m(t)*\hat{g}_m(-t) = (g_m^T(t)*i(t))*\hat{g}_m(-t) = (g_m^T(t) \\ *\hat{g}_m(-t))*i(t), \quad \text{(Equation 38)}$$

where $R_{i\hat{g}_m R}(t) \in R^{L \times 1}$, $i(t) = 1 \cdot i(t)$ for $1 \in R^{L \times 1}$, a vector of ones.

Intuitively, from the results of the scalar case discussed previously and T/R I, we expect that this vector signal should be summed over the sensor array to yield equivalent results; that is, T/R processing of this vector (array) data implies that each of the component vector outputs be summed, since they are aligned in phase from the basic nature of time-reversal. Therefore, this operation is equivalent to physically beam forming or focusing on receive. Mathematically, to develop this intuition, let us re-arrange the receiver expression of Equation 38 as $$R_{i\hat{g}_m R}(t) = \hat{g}_m(-t)*z_m(t) = (\hat{g}_m)(-t)*g_m^T(t)* = C_m(t)*i(t), \quad \text{(Equation 39)}$$

for $C_m(t) \in R^{L \times L}$, a correlation matrix with its cross-correlation components $C_{\hat{g}_k g_l}(m;t) = \hat{g}_{mk}(-t)*g_{ml}(t)$ for $k=1, \ldots, L$; $l=1, \ldots, L$. This matrix can be interpreted physically, since the diagonals are the auto-correlations of the individual sensor elements focused (on reception) at the $m^{th}$-client receiver with the off-diagonals corresponding the sensor cross-correlations. Theoretically, T/R focusing conditions imply that the sensor cross-correlations terms should be null. This is also equivalent to the conditions that there is no mutual coupling between sensor elements. Therefore, $C_m(t) \rightarrow \tilde{C}_m(t) \equiv \text{diag}[C_m(t)]$.

The information vector is simply, $i(t) = 1 \cdot i(t)$ for $1 \in R^{L \times 1}$, a vector of ones (as before); therefore, assuming no mutual coupling, we have that cross-correlation terms vanish and $$R_{i\hat{g}_m R}(t) = \tilde{C}_m(t)*i(t) = \begin{bmatrix} C_{\hat{g}_1 g_1}(m;t) \\ \vdots \\ C_{\hat{g}_L g_L}(m;t) \end{bmatrix} \otimes i(t) \quad \text{(Equation 40)}$$

Summing at the receiver, the scalar output of this realization is $$R_{i\hat{g}_m R}(t) = (1^T \times R_{i\hat{g}_m R}(t)) = \sum_{l=1}^{L} C_{\hat{g}_l g_l}(m;t)*i(t). \quad \text{(Equation 41)}$$

T/R RECEIVER IV: The realization of this receiver is similar to that of T/R Receiver II; however, the reversed pilot signal measurement is performed on reception rather than transmission. We start with the receiver input, $z_m(t)$, from the transmitted wavefield of Equation 37 and convolve it with the pilot signal ($p_m$) and reversed pilot signal measurement ($z_{p_m}$) on reception, that is, we have $$z_{p_m}(t) = g_m^T(t)*p_m(t) = p_m^T(t)*g_m(t) \quad \text{(Equation 42)}$$

and therefore, at the receiver we obtain $$R_{ip_m R}(t) = z_{p_m}(-t)*z_m(t)*z_m(t)*p_m(t) = (p_m^T(-t)*g_m(-t))* \\ (g_m^T(t)*i(t))*p_m(t), \quad \text{(Equation 43)}$$

or $$R_{ip_mR}(t) = p_m^T(-t) * (C_m(t) * i(t)) * p_m(t) \quad \text{(Equation 44)}$$

using the correlation matrix. Using the commutative and associative properties of the convolution operator and again assuming no mutual coupling, ($C_m \rightarrow \mathcal{C}_m$), we obtain $$R_{ip_mR}(t) = \sum_{l=1}^{L} C_{g_lg_l}(m;t) * i(t) * (p_m(t) * p_m(-t)) \quad \text{(Equation 45)}$$

$$= \sum_{l=1}^{L} C_{g_lg_l}(m;t) * C_{p_mp_m}(t) * i(t).$$

Figure 8:
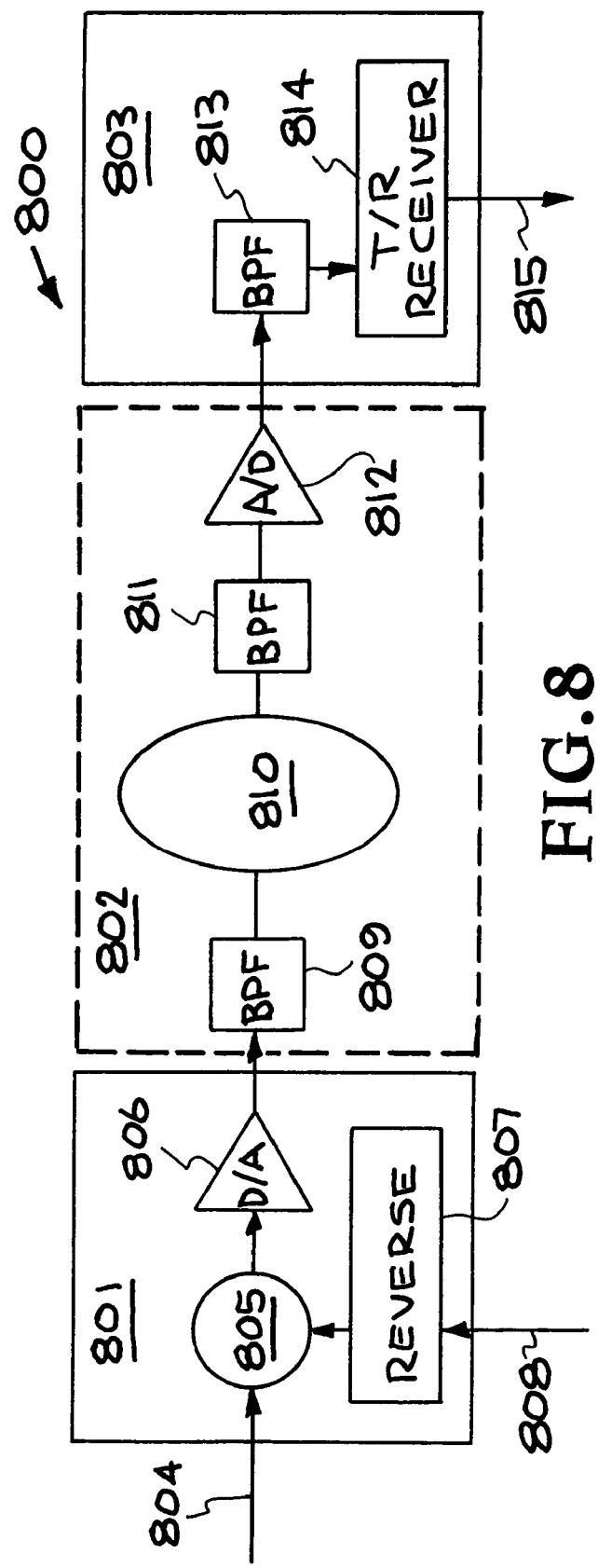
FIG. 8 illustrates a T/R I and II 1-bit design.
Figure 9:
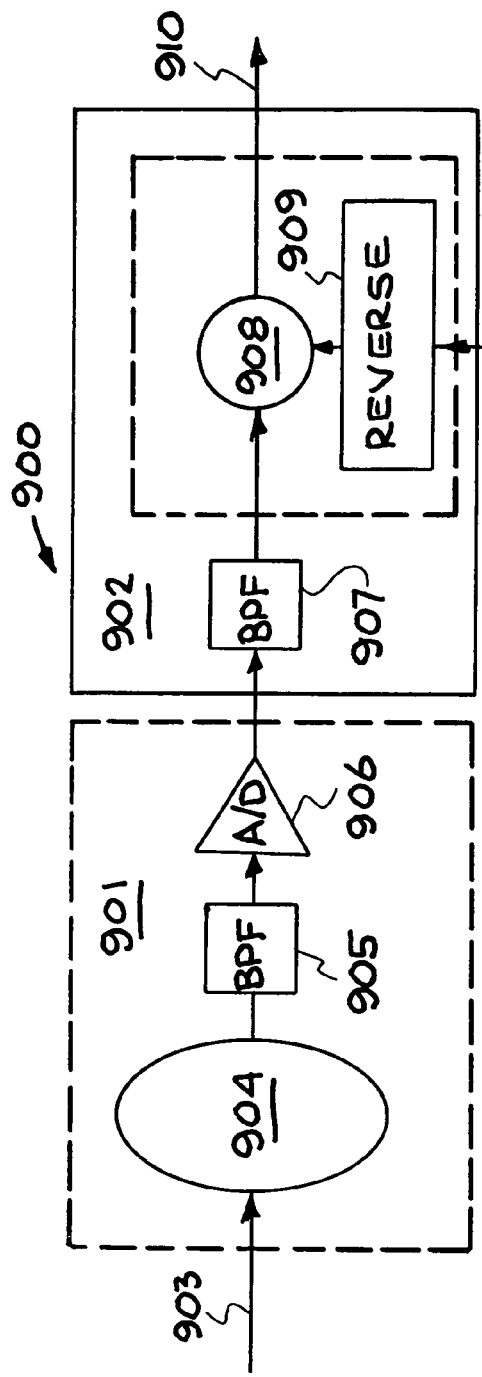
FIG. 9 illustrates a T/R III and IV 1-bit design.

Referring now to FIGS. 8 and 9, 1-BIT T/R receiver realizations are illustrated. The T/R receivers are based on the underlying T/R principle that rather than eliminating the multipath information, it can be processed to significantly increase SNR, even in highly reverberant environments. To accomplish this enhancement the unique paths between host and clients are retraced throughout the medium using the spatial and temporal information obtained by employing an estimator obtained in establishing the initial communications link. That is, the pilot signal is used to estimate the underlying Green's function paths from transmitter array element to client locations as previously illustrated. The spatial information provided by the host array is not only used to establish the unique link between host and client, but also to increase SNR incorporating the inherent array gain (spatially) as well as the multipath arrivals (temporally). Both sets of spatial and temporal information enable the T/R receiver to perform as the optimal spatio-temporal matched-filter.

Since the spatial information in the transmitted signal is essentially captured by the phase portion of the propagating wave (g(r;t)), the amplitude information is not as critical in utilizing the multipath; therefore, Applicants developed a receiver that ignores or quantizes the amplitude and merely exploits the "phase-only" time reversed signals. This is accomplished, quite simply, by recording the corresponding zero-crossings of the time-reversed signals quantized between 0-1 amplitudes establishing what Applicants define as the 1-BIT T/R receiver realization.

The major advantage of such an implementation is that instead of requiring an expensive analog-to-digital (A/D) converter (e.g., 24-bits) a simple threshold switch can be used instead, since all that is required is to detect the zero-crossings. This is especially important in the electromagnetic case or for that matter any high frequency applications where digitization is expensive and prohibitive to consider (e.g., terahertz regime).

The disadvantage of this approach is increased quantization error and noise. That is, the noise will also be quantized to the 0-1 amplitudes at its inherent high frequency zero-crossings as well. However, the high frequency noise is removed quite naturally by the usual bandpass filtering in the transmission bandwidth of the information.

Referring now to FIG. 8 and FIG. 9, two generic realizations, reversal-on-transmit or reversal-on-receive, for the 1-bit design are illustrated and designated generally by the reference numeral 1000. For T/R I and II (reverse-on-transmit), the realization is shown in a separating the analog 802 and digital 803 implementations required along with T/R III and IV (reverse-on-receive). Here Applicants annotate the 1-bit quantized functions by the overbar, "¯". For instance, if Applicants were to quantize the estimated Green's function using a 1-bit A/D, Applicants would obtain $$\hat{\bar{g}}(r;t) = \begin{cases} 1 & \hat{g}(r;t) \geq T \\ -1 & \hat{g}(r;t) < T \end{cases}, \quad \text{(Equation 46)}$$

with T the selected quantization threshold. The underlying mathematics was actually developed using the quantized notation, but little insight was gained, since the quantization process is nonlinear and the operations could not be decomposed. Suffice it to say that Applicants simply describe the operation of the 1-bit designs in FIGS. 8 and 9.

Figure 10:
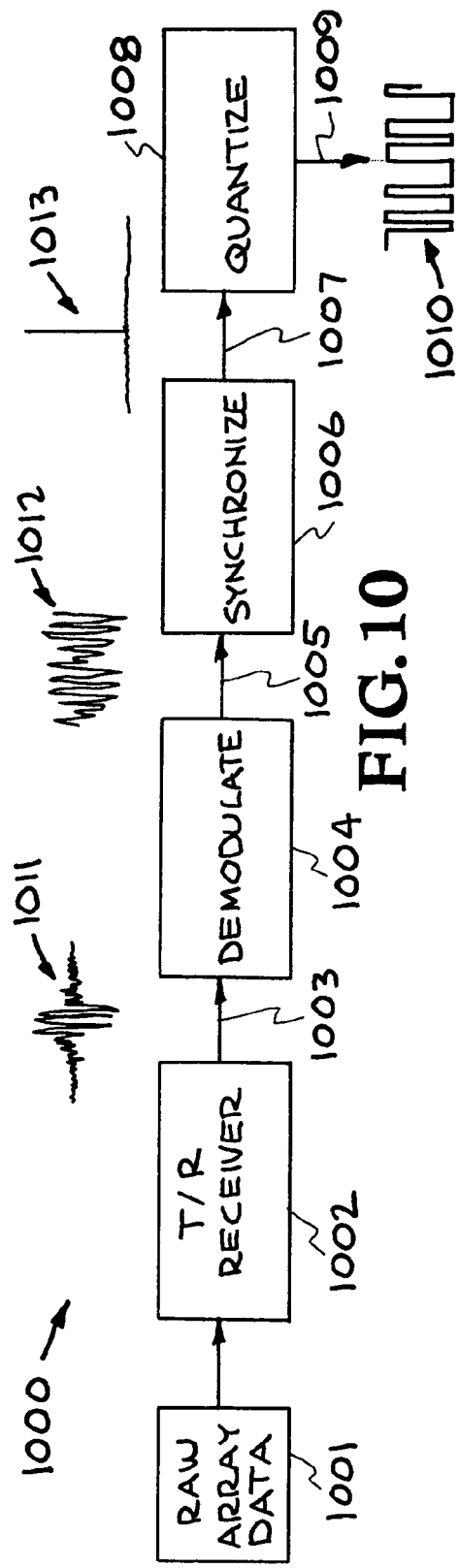
FIG. 10 illustrates signal processing of experimental data.

In FIG. 8 Applicants illustrate the design of a 1-bit T/R receiver for transmission. In both T/R I and II, the quantized signals are reversed and convolved (in software) with the information sequence, converted for transmission using a digital-to-analog (D/A) converter 806, bandpass filtered (BPF) 809 and transmitted by the array into the medium 810. Even though these signals have been quantized as signified by the overbar notation, once a digital convolution operation occurs, new amplitude information other than a ±1 is superposed. On reception, two BPF 811 are utilized prior to A/D conversion 812. Out of band interference as well as anti-alias filtering is provided by the first analog BPF 811, while the second digital BPF 813 (after A/D 1012) smoothes the quantized measurement reducing quantization error and eliminates the high frequency noise created by the 1-bit quantization process. This processed data is then input to the usual demodulation, synchronization and information extraction operations as illustrated in FIG. 10.

The 1-bit T/R designs for reception are shown in FIG. 9. Here coded information is transmitted into the medium 904, analog BPF 905 and digitized using the 1-bit A/D 906 as before, while the second digital BPF 907 performs the same basic role of filtering, smoothing and noise rejection. The processed measurement is then convolved (in software) with the reversed signals to extract the coded information using the T/R III and IV algorithms. Although not quite as good as the 24-bit designs, the results of the 1-bit T/R implementations are quite reasonable, while simultaneously providing a huge cost savings for high frequency communications in a reverberant medium.

Code Synchronization—After the processed T/R signal is demodulated using a phase-locked method to align the carrier, synchronization is then performed. Synchronization is the process of aligning and locally generating the extracted code between receiver and transmitter and in many cases proves to be most complex and critical. BPSK codes using the double side band suppressed carrier (DSBSC) amplitude modulation (AM) technique are simultaneously transmitted from each array element to the client network. Applicants detect the transmitted information, using a matched-filter receiver such that the cross-correlation of i(t) and its estimate at the output of a T/R receiver î(t) achieve a maximum at some lag T, that is, $$\hat{T} = \max C_{i\hat{i}}(k-T)|_{k=T} = C_{i\hat{i}}(0). \quad \text{(Equation 47)}$$

Note that î(t) can be from any of the T/R receiver realizations. Therefore, in essence, all that is necessary is to "detect" that the transmitted information code has been recovered. This detection is accomplished by performing the matched-filter calculation above and locating the well-defined peak at $\hat{T}$. The known pilot signal can be used to estimate $\hat{T}$. It should also be noted that extracting the actual information sequence, as in the case of voice communications, requires the solution of the problem of estimating, î(t), from the noisy, reverberant transmission through the medium, which is the desired output of the T/R receiver. The estimated information is next quantized to compare with the actual transmitted code.

Quantization—For any of these receivers, the final processing step is to quantize the estimated and detected BPSK coded information sequence. The quantizer simply limits the estimated coded signal to A, above or below a specified threshold, that is, $$i(t) = \begin{cases} +A & \hat{i}(t) > T \\ -A & \hat{i}(t) \leq T \end{cases} \quad \text{(Equation 48)}$$

where A is the quantization level or amplitude and T is the pre-set threshold. It is interesting to note that just as in classical detection theory, the value of the threshold is also selected for the receivers based on some performance criterion. Applicants use a symbol error criterion to evaluate the performance of each of the receiver realizations in this paper. Symbol error is defined as the percentage of symbols missed over the total transmitted. In Applicants application, since a symbol is represented by one bit, symbol error is synonymous to bit error.

Applicants summarize the operations performed on the received data to extract the desired coded information sequence from the noisy, reverberant data in FIG. 10. All of the T/R receiver realizations incorporate the common functions of demodulation, synchronization and quantization to extract the transmitted codes from the host station. In FIG. 8, Applicants show that the raw signal is received by the T/R receiver and processed to produce the estimated code sequence. The data are then demodulated to remove the carrier providing the processed data for synchronization. Note that this step usually incorporates a phase-locked loop to align the carrier phase of the receiver with the transmitted carrier, perform the demodulation (multiplication) and low-pass filtering. Applicants found the loop an elegant solution to the problem but quite difficult to implement. Thus, Applicants chose to search for the initial phase yielding the best performance by minimizing the symbol error. A standard matched filter is then used to synchronize the processed data and temporally locate the onset of the code which is then quantized, extracted and compared to the transmitted for performance analysis.

Additional information about the present invention, about Applicants' data, about Applicants' research, about Applicants' tests, about Applicants' test result, and other information is disclosed in the following articles: "Multichannel time reversal communications in a highly reverberative environment," by James V. Candy, Brian Guidry, Andrew Poggio, and Claudia Kent, *Journal of the Acoustic Society of America*, May 2004, Volume 115, Issue 5, pp. 2467-2468 (2004) and "Multichannel time-reversal processing for acoustic communications in a highly reverberant environment," by James V. Candy, Andrew Poggio, David H. Chambers, Brian L. Guidry Christopher L. Robbins and Claudia A. Kent, *Journal of the Acoustic Society of America*, October 2005, Volume 118, Issue 4, pp. 2339-2354 (2005). The articles: "Multichannel time reversal communications in a highly reverberative environment," by James V. Candy, Brian Guidry, Andrew Poggio, and Claudia Kent, *Journal of the Acoustic Society of America*, May 2004, Volume 115, Issue 5, pp. 2467-2468 (2004) and "Multichannel time-reversal processing for acoustic communications in a highly reverberant environment," by James V. Candy, Andrew Poggio, David H. Chambers, Brian L. Guidry Christopher L. Robbins and Claudia A. Kent, *Journal of the Acoustic Society of America*, October 2005, Volume 118, Issue 4, pp. 2339-2354 (2005) are incorporated herein by this reference.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A communication system for transmitting a signal through a hostile channel medium that creates deleterious dispersion and multipath effects on the signal, comprising:
    a transmitter adapted to transmit said signal into the channel medium,
    a multiplicity of receivers adapted to receive said signal after it has passed through the channel medium,
    a 1-bit analog to digitial digitizer included with said receivers that digitizes said signal and produces a digitized signal, and
    a time-reversal signal processor connected to said digitizer and adapted to time-reverse said digitized signal and produce an output signal that mitigates the deleterious dispersion and multipath effects on the signal.

2. The communication system of claim 1 including a communications array.

3. The communication system of claim 1 including a communications array operatively connected to said receivers.

4. The communication system of claim 1 including a communications array operatively connected to said transmitter.

5. The communication system of claim 1 including a communications array operatively connected to said receivers and a communications array operatively connected to said transmitter.

6. A communication system for transmitting a signal through a hostile channel medium that creates deleterious dispersion and multipath effects on the signal, consisting of:
    a transmitter adapted to transmit the signal into the channel medium;
    a receiver adapted to receive said signal after it has passed through the channel medium, said receiver including a multiplicity of individual receivers;
    a 1-bit analog to digital digitizer that digitizes said signal and produces a digitized signal, and
    a time-reversal signal processor connected to said digitizer and adapted to time-reverse said digitized signal and produce an output signal that mitigates the deleterious dispersion and multipath effects on the signal.

7. A communication method of transmitting a signal through a channel medium that creates deleterious dispersion and multipath effects on the signal, comprising the steps of:
    transmitting the signal into the channel medium,
    receiving the signal after it has passed through the channel medium,
    digitizing said signal utilizing a 1-bit analog to digitial digitizer that digitizes said signal and produces a digitized signal, and
    time-reversing said digitized signal to produce an output signal that mitigates the deleterious dispersion and multipath effects on the signal.

8. The method of claim 7 including using a multiplicity of receivers in said step of receiving the signal after it has passed through the channel medium.

9. The method of claim 7 including using a multiplicity of transmitters in said step of transmitting the signal into the channel medium.

10. The method of claim 7 including using a multiplicity of transmitters in said step of transmitting the signal into the channel medium and including using a multiplicity of receivers in said step of receiving the signal after it has passed through the channel medium.

* * * * *